Patented Oct. 21, 1930

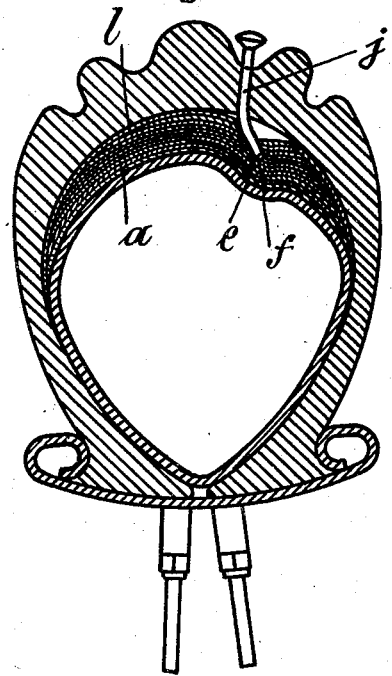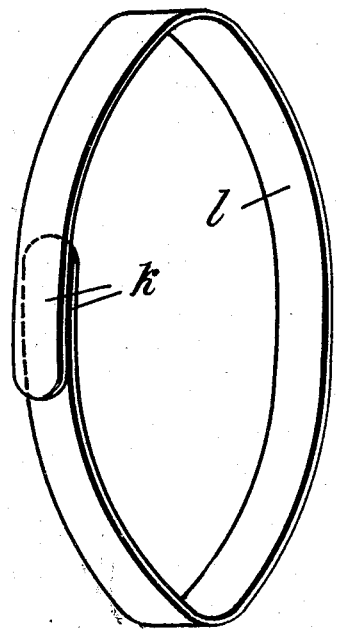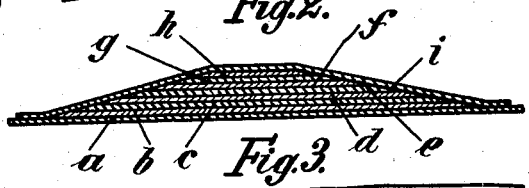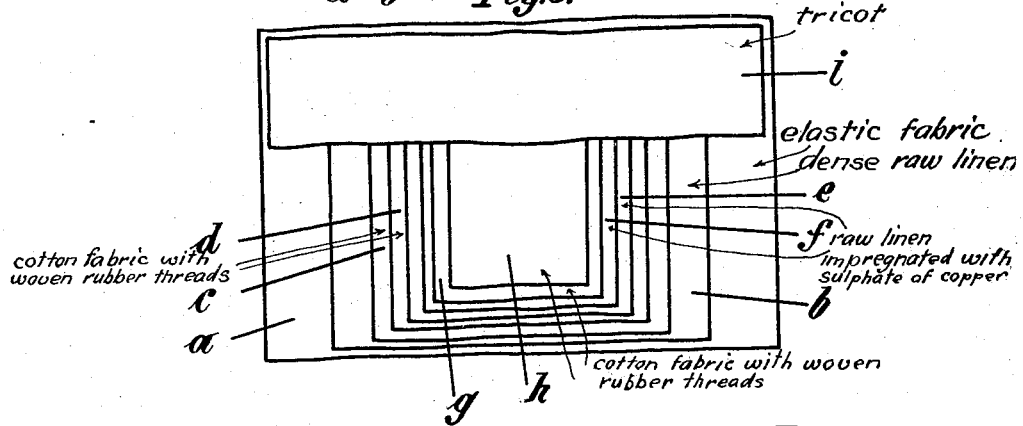

1,779,014

UNITED STATES PATENT OFFICE

RICHARD SCHÄFER AND ANDREAS MEIER, OF BERLIN, GERMANY

TIRE INTERLINER

Application filed March 28, 1929, Serial No. 350,595, and in Germany November 7, 1927.

This invention relates to a tire insertion for motor driven vehicles and motor cycles, which consists of several layers or strips of fabric and linen. According to the invention the insert consists (1) Of a layer of wide-meshed elastic fabric on which a layer of rubber is vulcanized. On this vulcanized layer follows a layer of dense raw linen on which follow two layers of narrow meshed cotton fabric through which rubber threads are woven. On these layers of cotton fabric follow two layers of raw linen impregnated with sulphate of copper, on which follow two layers of cotton fabric through which rubber threads are woven. All the layers are enveloped by a cover of narrow meshed elastic woven tricot so that a solid ring-shaped bandage is formed adapted to be inserted between the cover and the air tube. The insert is distinguished in that penetrating of foreign bodies like nails, broken glass, stones and the like into the air tube is effectively prevented, that further no abnormal heat can be produced by friction, that creeping of the insert in the cover is excluded and that no irregularities can be formed in the insert.

A form of construction of the tire insert according to the invention is illustrated in the accompanying drawing in which:

Fig. 1 is a cross section through a wheel tire with the tubular protecting insert between the cover and the air tube, a nail which has punctured the cover being shown.

Fig. 2 is a cross section showing the insert laid flat on the support.

Fig. 3 shows in top plan view a portion of the insert.

Fig. 4 is a perspective view, showing the protecting strip of the insert.

The lowermost layer $a$ of the insert bearing on the air tube consists of a wide meshed elastic fabric on which by vulcanization a rubber layer is fixed so that a friction exerted upon the air tube is reduced to a minimum.

The second layer $b$ consists of dense raw linen designed to give the shape to the insert.

The two next higher layers $c$ and $d$ consist of narrow meshed cotton fabric through which rubber threads are woven and on which follow at the middle of the insert two layers of raw linen $e$ and $f$ impregnated with sulphate of copper so that they possess great density, smoothness and toughness and not only prevent penetrating by a foreign body (Fig. 1) but push the same out of direction and equalize the bulging in of the insert and of the air tube in cooperation with the air pressure in this tube. The two uppermost layers $g$ and $h$ on the middle layers $e$ and $f$ consist, same as the layers $c$ and $d$, of narrow meshed cotton fabric through which rubber threads are woven. These uppermost layers enclose, owing to their elastic stretchability, the penetrating foreign body in such a manner that it cannot get at the air tube. The eight layers $a$ to $h$ are superimposed in pyramid shape (Fig. 2) so that after a narrow meshed cover $i$ of tricot has been placed over the insert, this insert can be bent in ring-shape. The outer cover of the insert is further formed by a gummed linen-strip $l$ (Fig. 4) which encloses the insert and the ends $k$ of which are stuck onto the cover $i$ so that the outer rough side of the outer cover strip $l$ bearing against the inner side of the tire cover prevents shifting of the insert in the tire cover.

We claim:

1. In a tire insertion for motor-car and motor-cycle tires, a layer of coarse-meshed elastic fabric covered with a vulcanized rubber layer, a next higher layer of dense raw linen, a next higher layer of cotton fabric woven through with rubber threads, a next higher layer of raw linen impregnated with sulphate of copper, an uppermost layer of cotton fabric woven through with rubber threads, a cover of narrow-meshed elastic woven tricot enclosing all of said other layers so that a resistant ring-shaped bandage is formed, and a linen strip on the outer cover side of the interliner adapted to bear with its rough outer surface against the outer cover of the tire.

2. Interliner for motor-car and motor-cycle tires, comprising in combination, an elastic coarse meshed fabric on the inner tube side of the inter-liner, sets of double layers of cotton fabric strips, a rubber strip vulcanized on its entire surface on the underside of said interliner, linen strips steeped in sulphate of copper between the sets of double layers of cotton fabric strips, rubber threads woven through the cotton fabric strips and an outer linen strip having a rough outer surface adapted to bear against the outer cover of the tire.

In testimony whereof we affix our signatures.

RICHARD SCHÄFER.
ANDREAS MEIER.